May 4, 1954 R. G. SCHULER 2,677,725

TELEGRAPH RECEIVER UTILIZING ELECTRONIC DISTRIBUTORS

Original Filed Oct. 15, 1948 4 Sheets-Sheet 1

INVENTOR
REGINALD G. SCHULER
BY Emery Robinson
ATTORNEY

INVENTOR
REGINALD G. SCHULER
BY Emery Robinson
ATTORNEY

May 4, 1954 R. G. SCHULER 2,677,725

TELEGRAPH RECEIVER UTILIZING ELECTRONIC DISTRIBUTORS

Original Filed Oct. 15, 1948 4 Sheets-Sheet 3

INVENTOR
REGINALD G. SCHULER
BY Emery Robinson
ATTORNEY

May 4, 1954 R. G. SCHULER 2,677,725

TELEGRAPH RECEIVER UTILIZING ELECTRONIC DISTRIBUTORS

Original Filed Oct. 15, 1948 4 Sheets-Sheet 4

INVENTOR
REGINALD G. SCHULER
BY Emery Robinson
ATTORNEY

Patented May 4, 1954 2,677,725

UNITED STATES PATENT OFFICE 2,677,725

TELEGRAPH RECEIVER UTILIZING ELECTRONIC DISTRIBUTORS

Reginald G. Schuler, Barrington, Ill., assignor to Teletype Corporation, Chicago, Ill., a corporation of Delaware Original application October 15, 1948, Serial No. 54,768, now Patent No. 2,622,153, dated December 16, 1952. Divided and this application September 12, 1950, Serial No. 184,465

6 Claims. (Cl. 178—50)

Figure 1:
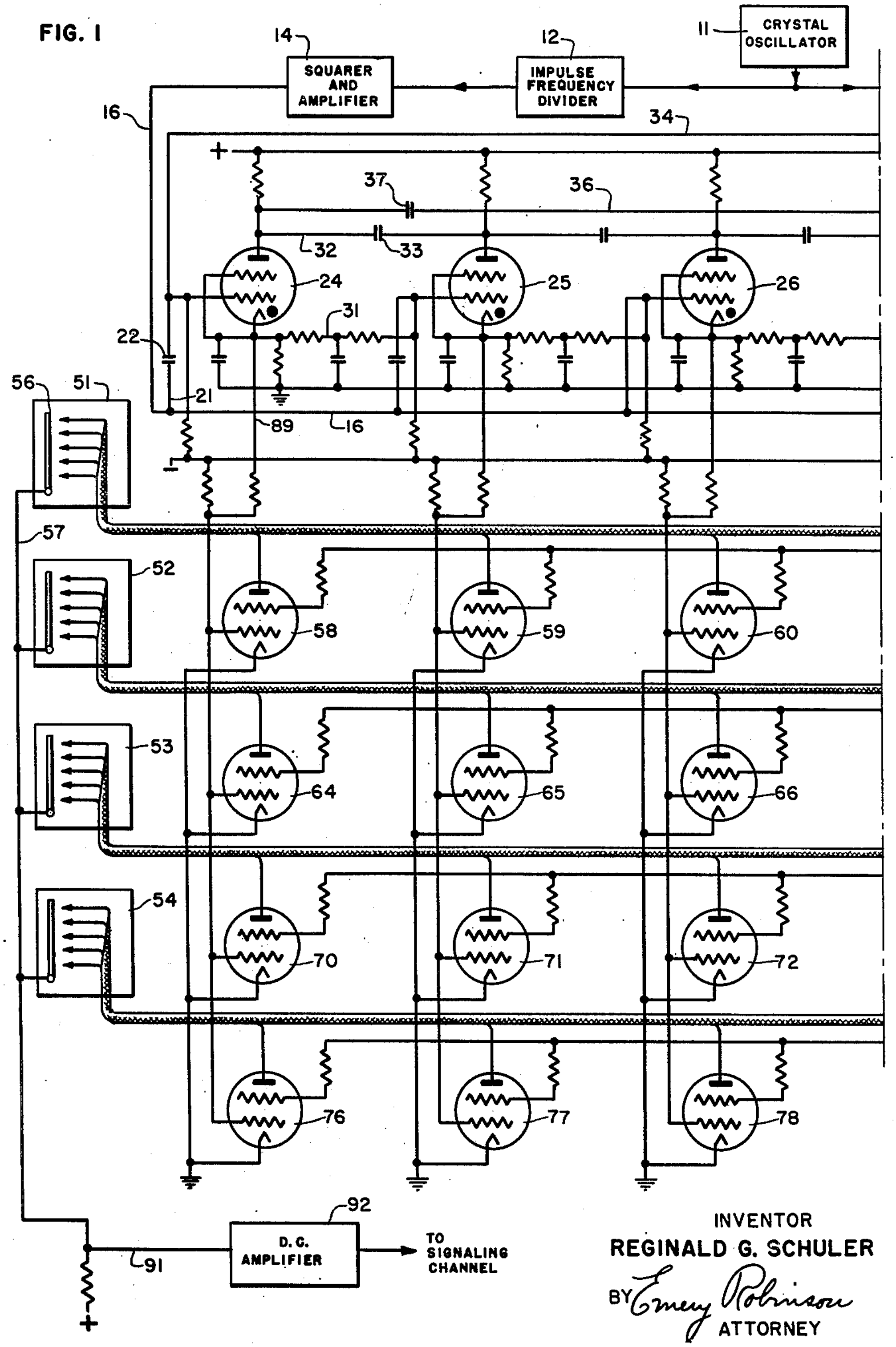

The present invention relates to telegraph apparatus and systems, and more particularly to multiplex telegraph apparatus and systems of the electronic type.

This application is a division of copending application Serial No. 54,768, filed October 15, 1948, now Patent No. 2,622,153, December 16, 1952.

The normal practice in multiplex telegraphy is to transmit from a plurality of channels of intelligence by means of a single mechanical distributor which is connected to the plurality of sources of intelligence and which during each cycle of operation transmits the correct impulses for the particular signal of each channel. The scheme of transmission may be of two types; one, transmitting all of the impulses of the signal for one channel and thereafter successively transmitting all of the impulses for the remaining channels separately or; two, by transmitting the first impulse for the first channel and thereafter the first impulse for the remaining channels and then repeating by transmitting the second impulse, etc., similarly. It is usual practice to transmit from not more than four sources or channels of information.

The above systems which are known and now in use operate satisfactorily with the exception that because of the use of a mechanical distributor and its component elements it requires a considerable amount of adjustment and maintenance because of normal wear of parts. Further, when such a system is operated at a high speed there is a tendency for the brush of the distributor which is traversing the individual segments, or the sequentially closing contacts, to bounce resulting in poor signal transmission. These and other factors limit the maximum speed of reliable operation.

Accordingly, an object of the present invention is to provide multiplex telegraph apparatus which will operate at high speeds and require a minimum of maintenance and replacements of parts.

A second object of the present invention is to provide multiplex telegraph apparatus which is almost entirely electronic.

A further object of the present invention is to provide multiplex telegraph apparatus utilizing electronic distributors.

Still another object of the present invention is to provide multiplex telegraph apparatus utilizing an electronic distributor operating at impulse frequency and an electronic distributor operating at channel frequency in order to provide for the proper transmission of signals.

A still further object of the present invention is to provide multiplex telegraph apparatus utilizing two electronic distributors which are controlled by the same frequency source at different speeds of operation.

Yet another object of the present invention is to provide control for a signal initiating device or recording device by means of the operation of an electronic channel distributor.

Figure 2:
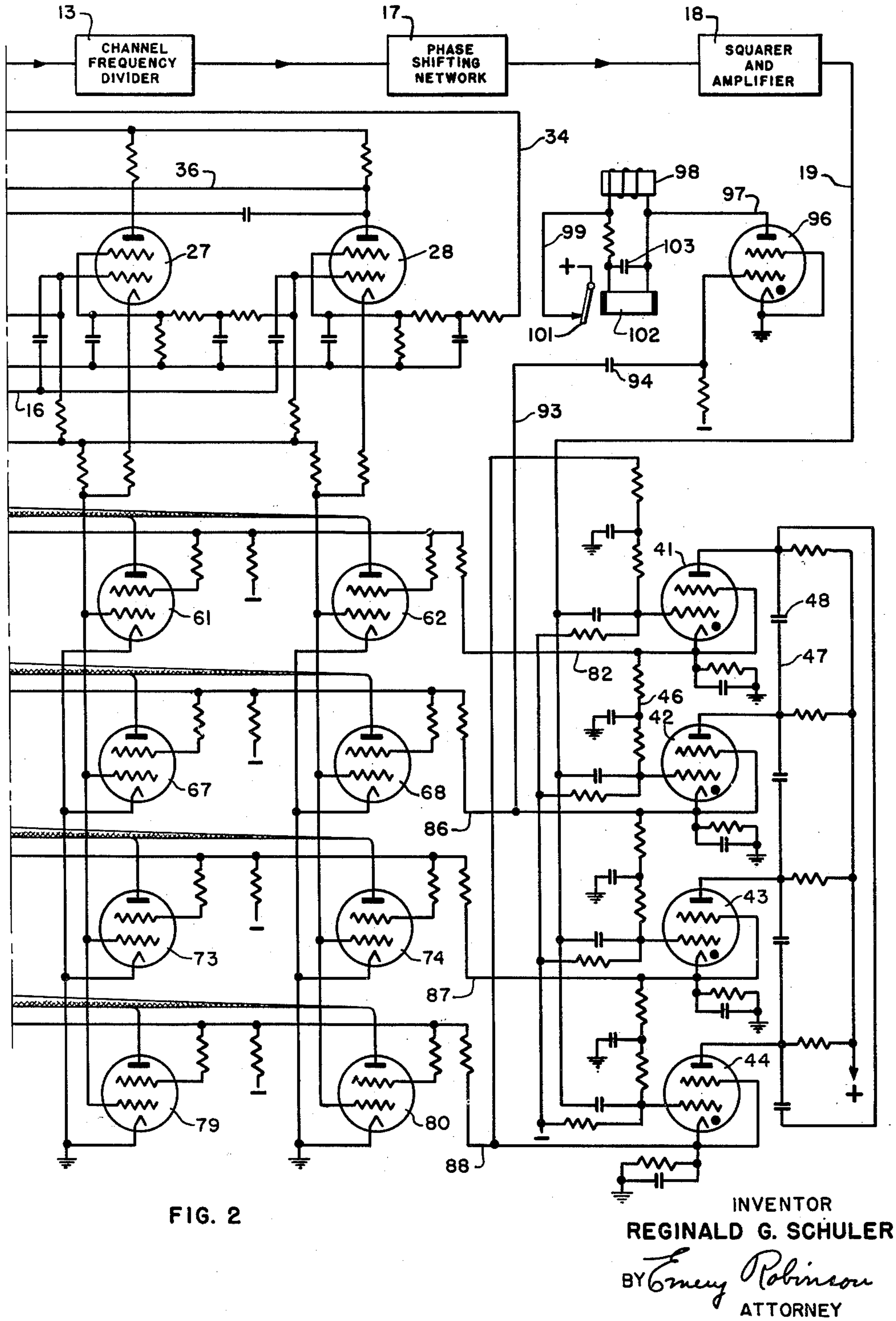
Figure 3:
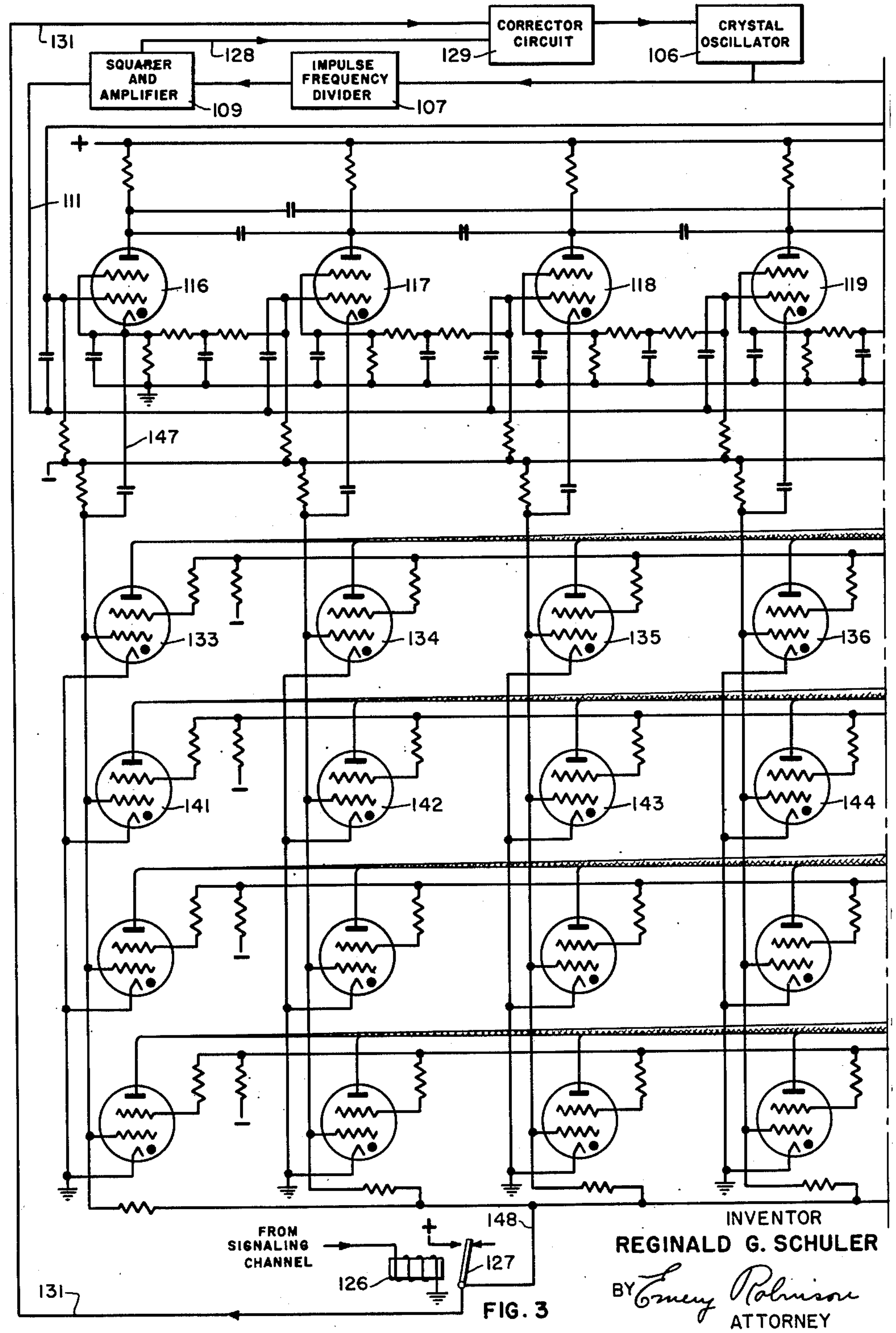
Figure 4:
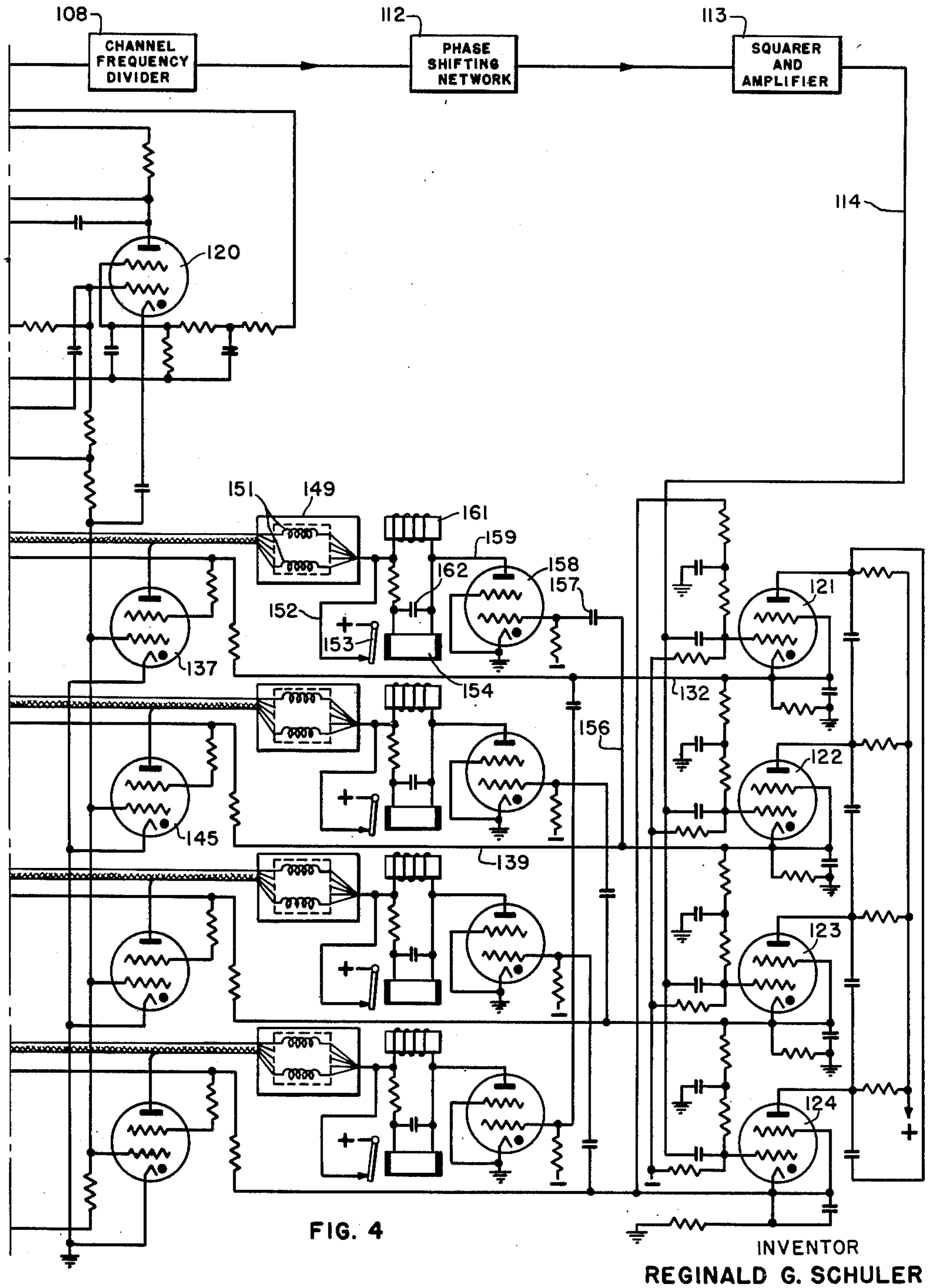

Further features and advantages of the apparatus embodied in the present invention will become apparent from the following detailed description thereof when read in conjunction with the accompanying drawings, in which:

Figs. 1 and 2 illustrate schematically the transmitting apparatus for use in a multiplex system, when assembled with Fig. 1 to the left of Fig. 2, and, Figs. 3 and 4 illustrate schematically the receiving apparatus for use in a multiplex system, when assembled with Fig. 3 to the left of Fig. 4.

The transmitting apparatus provides generally a plurality of sources of signals for transmission, such for instance, as from four tape sensing devices, which are well known in the art. A source of oscillations is provided which operate two frequency dividers to provide potentials for operating an electronic impulse distributor and an electronic channel distributor at the proper frequency of operation in order to provide proper signal transmission. Both of the electronic distributors are of the ring type which after they have completed a cycle of operation will initiate a following similar cycle of operation. A plurality of secondary or matrix tubes are provided for each channel of transmission, there being a number of tubes in each group equal to the unit code of transmission. The matrix tubes are under the conjoint control of the signal initiating devices, the impulse distributor output, and the channel distributor output for initiating signals over a signaling channel. Means are also provide under the control of the channel distributor for setting up a succeeding selection in the signal initiating device after the multiplex system has transmitted a particular signal.

The receiving apparatus comprises generally a pluarlity of matrix tubes which are under the control of a line relay connected to the signaling channel. The matrix tubes are controlled similarly to those at the transmitting station by means of an impulse distributor and a channel distributor which are both electronic and are both controlled as to speed of operation by frequency dividers operating under the control of a common crystal oscillator. A corrector circuit is provided to insure that the receiving apparatus will operate at a speed commensurate with that of the received signals. Means are also provided under the control of the channel distributor to cause the operation of the recording device in accordance with the received signal.

Referring now to Figs. 1 and 2, it may be seen that a crystal controlled oscillator indicated generally by the numeral 11 has been provided. The oscillator 11 is shown in block diagram only and may be any of the types which are well known in the art, such for instance as the well known electron coupled oscillator.

The output of the crystal oscillator 11 is fed over obvious circuits to a pair of frequency dividers indicated generally by the numerals 12 and 13. The frequency dividers have been illustrated in block diagram only as such are well known in the art, and may be of the type disclosed in Patent No. 2,410,389 issued to E. Norrman on October 29, 1946. The two frequency dividers 12 and 13 are provided to initiate a frequency output different to each other, which will become apparent during the following description of the apparatus. However, it is obvious that if the two different required frequencies could be derived from a single frequency divider by tapping it at different stages a single one would suffice.

The output of the frequency divider 12 is impressed over an obvious circuit to a squaring and amplifying device indicated generally by the numeral 14. The device 14 has been illustrated in block diagram only, as squaring and amplifying tube circuits are well known in the art. The positive pulse output of the device 14 is impressed on a conductor 16.

The output of the frequency divider 13 is impressed over obvious circuits and through a phase shifting network indicated generally by the numeral 17 and a squaring and amplifying device indicated generally by the numeral 18 to a conductor 19. Both the network 17 and the device 18 have been illustrated in block diagrams as tube circuits for accomplishing such functions are well known to those versed in the art.

The output of the frequency divider 12 as squared and amplified by the device 14 and impressed on the conductor 16 will be such that positive operating pulses will be impressed on such conductor at intervals indicative of the impulse speed of transmission of the various signals. That is, a positive pulse on the conductor 16 will occur to initiate a signal impulse and the succeeding potential pulse on the conductor 16 will define the end of the signal impulse, and likewise the initiation of the succeeding impulse.

The positive pulses on the conductor 16 are impressed over branching conductors such as 21 and through condensers such as 22 to the normally negatively biased control grids of five gas filled tubes 24 to 28, inclusive, of the Thyratron type. The tubes 24 to 28, inclusive, form an electronic distributor of the ring type, each of the tubes being of the variety that once rendered conducting will continue to conduct irrespective of grid potential until the proper alteration occurs in the cathode or anode circuit. With respect to the instant embodiment it should be assumed that one of the tubes such as 24 is conducting at this time. While no start circuit for the tube 24 has been illustrated, nor any of the other tubes 25 to 28, inclusive, it may be readily understood that such may be done by providing a manually operable contact or push button in the grid circuit of any one of the tubes so that upon the closure of the same, battery will be supplied of a sufficient value to offset the normal negative bias on the control grid of that tube and thereby allow it to be rendered conducting. A similar start circuit has been illustrated in copending application Serial No. 596,295, filed on May 28, 1945, in the name of T. A. Hansen, now Patent No. 2,609,452.

If it be assumed that the tube 24 is conducting, positive potential will be impressed from its cathode output circuit through suitable resistors and over a conductor 31 to the control grid of the succeeding distributor tube 25. This potential in itself will not be sufficient to raise the value of the grid sufficiently high to cause the tube 25 to be rendered conducting but instead acts as a conditioning potential. At such time as the next positive impulse is received on the common conductor 16 and impressed over branching conductors such as 21 and through condensers such as 22 to the control grids of all of the tubes 24 to 28, inclusive, only tube 25 will be rendered conducting, which tube is receiving a conditioning potential over the conductor 31. It might be noted at this time that the tube 24 will no longer have its starting device closed at this time, such being closed momentarily only for a time sufficient to allow the tube 24 to be rendered conducting.

The positively energized anodes of the tubes 24 and 25 are connected together by means of a conductor 32 and a condenser 33. The condenser 33 is of the commutating type and acts when the tube 25 is rendered conducting to extinguish the tube 24. The use and action of commutating condensers are well known in the art and are described in detail in the above mentioned copending application in the name of T. A. Hansen.

The succeeding tubes 26 to 28, inclusive, are connected in a manner similar to the tubes 24 and 25, so that as any one of the tubes conducts it supplies conditioning potential over a conductor such as 31 to the control grid of the associated succeeding tube. Likewise, the anodes of succeeding tubes are connected together through commutating condensers such as 33 which causes a preceding tube to be extinguished upon the initiation of conduction in a succeeding tube. In view of such interconnections it may be seen that each of the tubes 24 to 27, inclusive, supplies conditioning potential for a succeeding tube over obvious circuits so that upon the receipt of the next positive impulse on the common conductor 16 a succeeding tube will be rendered conducting. Also, at such time the preceding tube will be extinguished through the use of commutating condensers.

In order to complete ring operation of the impulse distributor tubes the last tube 28 of the series has its cathode output circuit connected through suitable resistors by means of a conductor 34 to the control grid of the first tube 24 in the series. Therefore, at such time as the tube 28 is conducting a conditioning potential will be impressed over the conductor 34 to cause the tube 24 to be rendered conducting upon the receipt of the next positive pulse on the common conductor 16. Also, the anode of the last tube 28 in the series is connected over a conductor 36 and through a commutating condenser 37 to the anode of the first tube 24 in the series. Thus, at such time as the tube 24 is rendered conducting, it will cause the tube 28 to be extinguished.

similarly as described with respect to the other commutating condensers.

A time delay network is provided in the conditioning output circuit of one tube and the control grid circuit of the succeeding tube, which is composed of the resistor-condenser combination, in order that the action between each pair of tubes will be as described above, and no two tubes will be successively rendered conducting by the same driving impulse.

The impulse distributor, its components, and its manner of operation as described above are all described and illustrated in detail in the copending previously mentioned application in the name of T. A. Hansen.

The positive pulses which are impressed on the conductor 19 from the channel frequency divider 13 and through the phase shifting network 17 and the squaring and amplifying device 18 are impressed through individual condensers to the normally negatively biased control grids of a plurality of gas filled tubes 41 to 44, inclusive, of the Thyratron type. This potential is not sufficient in itself to cause any of the tubes 41 to 44, inclusive, to be rendered conducting but acts as an operating potential under conditions about to be described.

In the following description it should be assumed that the tube 41 is conducting, having been rendered in such condition by a start circuit similar to that described above, or having been initiated by a start circuit associated with one or the other tubes 42 to 44, inclusive, and the distributor having stepped to a position that tube 41 will be conducting. During the interval that the tube 41 conducts, potential will be impressed from its cathode output circuit through suitable resistors and over a conductor 46 to the control grid of the succeeding tube 42. This potential will not be sufficient to overcome the negative bias on the grid of the tube 42 to cause it to be rendered conducting at this time but instead will act as a conditioning potential. Upon such time as the next positive pulse is impressed over the common conductor 19 to the grids of the tubes 41 to 44, inclusive, the tube 42 will be rendered conducting.

The anodes of the tubes 41 and 42 are connected by means of a conductor 47 and a commutating condenser 48 in such manner that upon the tube 42 becoming conducting the tube 41 will be extinguished.

The ring operation of the tubes 41 to 44, inclusive, with one tube conditioning the succeeding tube, with the latter becoming conducting upon the receipt of the next positive pulse initiated by the frequency divider 13 and the extinguishment of the preceding tube through the use of the commutating condenser in the anode circuits is similar to that described with respect to the impulse distributor and is also similar to that illustrated and described in the copending T. A. Hansen application, and therefore, need not be repeated.

The electronic distributor formed by the tubes 41 to 44, inclusive, may be considered a channel distributor in that each of the tubes 41 to 44, inclusive, will remain conducting for a period of time sufficient to allow the impulse distributor to make a complete cycle of operation with the tubes 24 to 28, inclusive, all becoming conducting and extinguished for their predetermined interval of operation. Such timing of operation between the tubes 24 to 28, inclusive, and 41 to 44, inclusive, is provided through the use of the impulse frequency divider 12 and the channel frequency divider 13; that is, the impulse frequency divider 12 will supply a sufficient number of positive pulses to the conductor 16 to allow a complete cycle of operation of the tubes 24 to 28, inclusive, during the interval between successive pulses from the channel frequency divider 13 to the conductor 19. In this manner the five impulses comprising a signal on one channel will be transmitted through the operation of the tubes 24 to 28, inclusive, during which interval the tube 41 will be conducting. Thereafter the five impulses for each of the remaining channels will be transmitted during the intervals that the tubes 42, 43, and 44 are conducting, in a manner as will appear hereinafter. The phase shifting network 17 permits exact synchronism of the two distributors to be obtained, so that the channel distributor advances at the same instant that the impulse distributor completes its cycle.

Four signal initiating means indicated generally by the numerals 51 to 54, inclusive, have been provided, one each controlling a channel of transmission. The signal initiating means 51 to 54, inclusive, may be tape sensing devices which are well known in the art, or may be start-stop to multiplex extensors such as are disclosed in U. S. Patent No. 2,382,596 issued to W. J. Zenner on August 14, 1945, or as disclosed in copending application Serial No. 54,775, filed on October 15, 1948, in the name of R. D. Slayton, now Patent No. 2,582,218, in the present embodiment the devices 51 to 54, inclusive, have been illustrated as tape sensing devices each having five contacts which are set permutatably in accordance with the sensing of the signal impulses in a tape. If a marking condition exists the contacts would be so positioned as to be in engagement with a common bus such as 56 in the device 51, which is connected over a common conductor 57 to a suitable source of battery. If a spacing condition exists the contacts are open as illustrated.

The contacts of the device 51 are connected individually to the anodes of five secondary or matrix dual-grid vacuum tubes 58 to 62, inclusive, which are associated with the first or "A" channel of transmission, and which is controlled by the "A" channel distributor tube 41.

The contacts of the device 52 are likewise connected individually to the anodes of five secondary or matrix tubes 64 to 68, inclusive, which are associated with the "B" channel of transmission, and which is controlled by the "B" channel distributor tube 42. The tubes 64 to 68, inclusive, are dual-grid vacuum tubes.

In a similar manner the contacts of the signal initiating device 53 are connected individually to the anodes of five secondary or matrix vacuum tubes 70 to 74, inclusive, which are associated with the third or "C" channel of transmission, and which is controlled by the "C" channel distributor tube 43.

Finally, the contacts of the fourth device 54 are connected individually to the anodes of five secondary or matrix vacuum tubes 76 to 80, inclusive, which are associated with the "D" channel of transmission, and which is controlled by the "D" channel distributor tube 44.

If it be assumed again that the "A" channel distributor tube 41 is conducting positive potential will be impressed from its output cathode circuit not only over the conductor 46 to the succeeding tube 42, but also over a conductor 82 and through suitable resistors to the normally negatively biased screen grids of the matrix tubes 58 to 62, inclusive. The potential impressed on the screen grids of the tubes from the common conductor 82 is not sufficient to cause any of these tubes to be rendered conducting, since their control grids still are negatively biased, but instead acts as a conditioning potential.

Similarly, if the tube 42 had been conducting at this time it would impress positive potential from its output cathode circuit over a common conductor 86 to the normally negatively biased screen grids of the tubes 64 to 68, inclusive. Such potential alone, however, is not sufficient to cause any of the tubes 64 to 68, inclusive to be rendered conducting but instead acts as a conditioning potential.

Likewise, if the "C" channel distributor tube 43 had been conducting at this time it would impress positive potential from its output cathode circuit over a common conductor 87 to the normally negatively biased screen grids of the tubes 70 to 74, inclusive. Such potential alone is to be rendered conducting but instead acts as a conditioning potential.

Finally, if the "D" channel distributor tube 44 had been conducting at this time it would impress positive potential from its output cathode circuit over a common conductor 88 and through suitable resistors to the normally negatively biased screen grids of the tubes 76 to 80, inclusive. This potential is not sufficiently high, however, to cause any of these tubes to be rendered conducting by itself but serves as a conditioning potential.

Assuming at the same time that the tube 24 is conducting, positive potential will not only be impressed from its output cathode circuit over the conductor 31 to the control grid of the succeeding tube 25, but also will be impressed over a common conductor 89 and through suitable resistors to the normally negatively biased control grids of the No. 1 matrix tubes 58, 64, 70 and 76 of the four channels "A" to "D," inclusive. The potential impressed on the conductor 89 will act as an operating potential to cause one of the tubes 58, 64, 70 or 76 to be rendered conducting, assuming anode potential to be present, in accordance with which one of these tubes receives a conditioning potential on its screen grid from its associated channel distributor tube 41 to 44, inclusive.

As it has been assumed in the description above that the channel distributor tube 41 and the impulse distributor tube 24 are both conducting at the same time the matrix tube 58 will be the only one which will at this time receive potential on both its screen and control grids to allow it to be rendered conducting, assuming again that anode potential is present.

If it is further assumed that the signal initiating device 51 has sensed a signal with the No. 1 impulse position marking the first contact will be in engagement with the common bus 56. While the connection between the contacts of the device 51 and the anodes of the tubes 58 to 62, inclusive, has been shown as a cable it should be understood that the first impulse position contact will be connected to the anode of the tube 58, the second impulse contact to the anode of the tube 59, etc. Under this condition, with the first impulse contact in a closed or marking position and with conditioning and operating potentials on the screen and control grids, respectively, of the matrix tube 58 a circuit will be established which may be traced from positive battery, over the common conductor 57 to the bus 56, through the first impulse contact in the device 51 which is assumed closed, over the cable connection to the anode of the tube 58, through the tube 58, which will be rendered conducting, to its cathode and thence over an obvious circuit to ground. Thus, under this condition the tube 58 will be rendered conducting.

If an assumption had been made above that the signal initiating device 51 had sensed a signal with a spacing condition in the No. 1 impulse position the contact assigned thereto would not be closed and in engagement with the common bus 56. Therefore, under this condition even though both conditioning and operating potentials had been applied to the screen and control grids, respectively, of the matrix tube 58 the tube would not be rendered conducting because no positive potential would be present from the conductor 57 to the anode thereof.

With the tube 58 conducting a potential drop will occur both on the common conductor 57, and a conductor 91 which are connected through a common resistor to positive battery. A similar potential drop will occur in a D. C. amplifier, or inverter and amplifier, indicated generally by the numeral 92 and connected to the conductor 91. The unit 92 has been indicated in block diagram as amplifiers or inverters, and amplifiers are well known tube circuits to those versed in the art. The output of the unit 92 is connected to a signaling channel for transmission of telegraph signals to a remotely located receiver. The unit 92 will be either an amplifier or an inverter and amplifier depending on the scheme of transmission, that is, whether a battery condition on the signaling channel will signify a spacing or a marking condition.

If the assumption had been made, as described above, that a spacing condition had been sensed in the No. 1 impulse position with the tube 58 not being rendered conducting during its interval because of lack of battery on its anode no potential drop would exist on the conductor 91 and, therefore, the unit 92 would cause transmission of a signal of an opposite condition to that described above.

As it was also described initially that the "A" channel distributor tube 41 remains conducting for a period of time during which the impulse distributor as exemplified by the tubes 24 to 28, inclusive, makes a cycle of operation, the tube 25 will be next rendered conducting and the tube 24 extinguished, all in a manner as described. Under this condition, the only matrix tube which will receive both a conditioning potential from the tube 41 and an operating potential from the tube 25 will be the No. 2 impulse matrix tube 59. Therefore, the tube 59 will either be rendered conducting or be not rendered conducting in accordance with the setting of the No. 2 impulse contact in the signal initiating device 51, in a manner as was described with respect to the No. 1 impulse contact for either a marking or spacing condition.

Similarly, the tubes 26, 27 and 28 will all be rendered conducting for their predetermined intervals during which time signals will be transmitted in a manner as described for the numbers 3, 4 and 5 impulse positions of the signal. It might be noted at this time that the distributor tubes 24 to 28, inclusive, will each remain conducting for a period of time to allow a complete signal impulse to be transmitted over the signaling channel whether it be a marking or spacing condition. Further, any of the matrix tubes such as 58 which may be rendered conducting will only remain conducting for the interval of time that their associated distributor tube such as 24 is conducting, for thereafter operating potential will be removed from the conductor such as 89 and as the matrix tubes are all of the vacuum variety they will no longer remain conducting irrespective of their anode potential.

After the impulse distributor has completed its cycle to allow the five signal impulses of the "A" channel to be transmitted over the signaling channel the "B" channel distributor tube 42 will be rendered conducting and the "A" channel distributor tube 41 extinguished, all as described above. Under this condition positive potential will no longer be impressed to the screen grids of the tubes 58 to 62, inclusive, over the common conductor 82 but instead conditioning potential will be impressed over the common conductor 86 to the screen grids of the "B" channel matrix tubes 64 to 68, inclusive. Thus, as the impulse distributor now completes a second cycle of operation, signals will be transmitted over the signaling channel in accordance with the setting successively of the "B" channel matrix tubes 64 to 68, inclusive, which in turn are controlled by their respective contacts in the signal initiating device 52.

After the above cycle is completed similar cycles will be likewise completed for the "C" and "D" channels as the tubes 43 and 44, respectively, are rendered conducting. In the above manner it may be seen that the first signal is transmitted successively for the "A," "B," "C," and "D" channels and thereafter the above cycle of the channel distributor will be repeated to allow the second character on each channel to be transmitted in succession. The above repetition occurs until such time as all message material available has been transmitted or until the apparatus is shut off.

In the above description the apparatus was shown as consisting of components necessary for the transmission of a five unit code and of four channels of transmission. It is obvious, however, that both the unit code and the number of channels may be altered by altering the impulse distributor and/or channel distributor, likewise the number of matrix tubes and increasing or decreasing the frequency output from the frequency divider 12 and/or the frequency divider 13 correspondingly.

In the above description it was mentioned that after a signal selection was set up in the signal initiating device 51 the impulse distributor and channel distributor operated through conduction of the tube 41 and the tubes 24 to 28, inclusive, to transmit the signal over the signaling channel indicative of the particular signal selection. After the transmission of such signal indicative of the "A" channel signal the channel distributor will operate with the tube 42 being rendered conducting and tube 41 extinguished. Under this condition the signal initiated in the device 52 will be transmitted indicative of the "B" channel signal selection. It is obvious from the above that during the intervals that signals are being transmitted from the signal initiating means 52, 53 and 54, which will occur after the transmission of the signal in the initiating means 51, it becomes desirable to cause a new signal selection to be initiated in the device 51 in readiness for the next interval of transmission of an "A" channel signal.

After the "A" channel signal has been transmitted the tube 42 is rendered conducting, as described above, which results in positive potential being impressed on its cathode output circuit and thence to the conductor 86. Potential will also be impressed from the conductor 86 to a branching conductor 93 and through a condenser 94 to the normally negatively biased control grid of a gas filled tube 96. Because of the condenser 94 a positive pulse only will be impressed on the control grid of the tube 96 at the time tube 42 first conducts, but this pulse will be sufficient to render tube 96 conducting, irrespective of the interval of conduction of the tube 42. The anode of the tube 96 is connected over a conductor 97, through the winding of a magnet 98, over a conductor 99 and through the normally unattracted armature 101 of a relay 102 to positive battery. Therefore, with the relay 102 de-energized and the armature 101 unattracted, the tube 96 will be rendered conducting at this time and the magnet 98 energized. The magnet 98, while not shown with the unit 51, is assumed to be the magnet utilized for stepping the tape sensing device, which in other words, causes the tape sensing probes to be removed therefrom and the tape to be advanced one character length.

The relay 102 is also connected to the source of positive battery by means of the unattracted armature 101 and the conductor 99 and thence completes its circuit over the conductor 97 and through the tube 96. However, a condenser 103 is placed in shunt relationship with respect to the winding of the relay 102 and, therefore, such relay will not be energized immediately upon the tube 96 being rendered conducting. However, after a predetermined time interval the charge on the condenser 103 will accumulate through the series resistor from conductor 99, allowing a potential drop across the winding of the relay 102 thereby causing it to be energized. As the relay 102 becomes energized it attracts the armature 101 thereby breaking the circuit which had been established previously to supply positive battery to energize the magnet 98, the relay 102, and to support conduction in the tube 96. Therefore, at this time the tube 96 will be extinguished and the magnet 98 and the relay 102 de-energized. The time delay supplied by the condenser 103 allows the magnet 98 to remain energized for a predetermined interval of time before the relay 102 is energized to break all connections to positive battery at its armature 102 and is sufficient to allow the tape stepping device in the unit 51 to be operated. The action of the condenser 103 also delays the release of the relay 102, thereby insuring complete extinguishment of tube 96. It might be noted that if the unit 51 is an extensor rather than a tape sensing device that the magnet 98 or the pulse on the conductor 93 may be utilized to cause the next character to be set up in the extensor.

It should be noted that only one of the circuits for causing the next character to be selected in the units 51 to 54, inclusive, has been illustrated and described, that being the one associated with the unit 51. However, it should be understood that it is contemplated that three similar circuits will be provided which will be associated with the output of the tube 43 for the unit 52, the output of the tube 44 for the unit 53, and the output of the tube 41 for the unit 54. In this manner sufficient time is allowed to set up characters for all of the channels after each character has been transmitted and prior to the time that the multiplex transmitter is ready to transmit the subsequent signal for that particular channel.

The electronic receiving apparatus contemplated for use with the above described transmitting apparatus is illustrated in Figs. 3 and 4. Referring now to these figures it may be seen that a crystal oscillator 106 is provided which is illustrated by a block diagram and is similar to that described with respect to the transmitting apparatus. The output of the crystal oscillator 106 is impressed over obvious conductors to an impulse frequency divider 107 and a channel frequency divider 108, both of which are illustrated in block diagram and are of a type identical with that described for the transmitting apparatus. The output of the impulse frequency divider 107 is impressed through a squaring and amplifying circuit 109 to a conductor 111. The device 109 has been shown in block diagram as such circuits are conventional and well known to the art.

The output of the channel frequency divider 108 is impressed through a phase shifting network 112 and a squaring and amplifying device 113 to a conductor 114. Both the network 112 and the device 113 are shown in block diagram only as they are similar to the units contemplated for use at the transmitting station and are both well known in the art.

The output from the impulse frequency divider 107 as squared and amplified by the unit 109 and impressed as a series of positive pulses to the conductor 111 are further impressed to the normally negatively biased control grids of a plurality of gas filled tubes 116 to 120, inclusive, through appropriate branching conductors and condensers. The tubes 116 to 120, inclusive, form an impulse distributor similar to that disclosed and formed by the tubes 24 to 28, inclusive, in the transmitting apparatus. Inasmuch as the tubes 116 to 120, inclusive, are interconnected and operate in a manner identical with that of the corresponding tubes at the transmitting apparatus to form an electronic distributor of the ring type it is not deemed necessary to repeat the description of the circuits or operation at this time.

The output of the channel frequency divider 108 which is adjusted to proper phase by the network 112 and squared and amplified by the device 113 to result in a plurality of positive pulses on the conductor 114 are impressed over branching conductors and through appropriate condensers to the normally negatively biased control grids of a plurality of gas filled tubes 121 to 124, inclusive. The tubes 121 to 124, inclusive, form a channel distributor of the ring type which is identical in operation and interconnection as that formed by the tubes 41 to 44, inclusive, in the transmitting apparatus. Thus, as the two channel distributors are identical in circuit connections and operations it is not deemed necessary to repeat the description of the one formed by the tubes 121 to 124, inclusive, at this time.

The signals being transmitted from the transmitting apparatus, described previously, over the signaling channing will be received in the winding of a line relay 126, the opposite terminal of which is shown connected to ground. The line relay 126 controls its armature 127 in accordance with the received signals, the relay 126 becoming energized upon a marking condition and causing its attracted armature 127 to be in engagement with a conductor leading to positive battery. Upon a spacing condition being received in the line relay 126 will remain deenergized with its armature 127 unattracted and in engagement with an unconnected conductor. Thus, at this latter time no battery is supplied to the armature 127.

It may be seen that output from the squaring and amplifying device 109 is also impressed over a conductor 128 to a corrector circuit 129 illustrated in block diagram only. The armature 127 of the line relay 126 is connected by means of a conductor 131 to the corrector circuit 129. The output of the corrector circuit 129 is connected over an obvious circuit to the crystal oscillator 106. It is contemplated that by use of the just described connections to and from the corrector circuit 129 the receiving apparatus may be operated at a speed commensurate with that of the received signals. While the corrector circuit 129 is shown in a block diagram only it is contemplated that the corrector circuit utilized with the present apparatus will be similar to that disclosed and described in copending application Serial No. 54,773, filed on October 15, 1948, in the name of T. A. Hansen, now Patent No. 2,595,656. Accordingly, such application is incorporated herein to the extent necessary for the correct and efficient operation of the described telegraph system.

During the interval that the tube 121 is conducting, positive potential will be impressed from its cathode output circuit over a conductor 132 and through appropriate resistors to the normally negatively biased screen grids of a plurality of secondary or matrix gas tubes 133 to 137, inclusive. The matrix tubes 133 to 137, inclusive, are similar to the corresponding matrix tubes at the transmitter assigned to the "A" channel in that the potential applied to the screen grids is not sufficient to cause the tubes to be rendered conducting. The only difference between the corresponding sets of tubes is that the instant ones are of the gas filled type and, therefore, once rendered conducting will continue to conduct irrespective of grid potential until the proper change occurs in the anode or cathode circuit.

The output of the "B" channel distributor tube 122 is connected by means of a conductor 139 and through suitable resistors to the normally negatively biased screen grids of secondary or matrix tubes 141 to 145, inclusive. The tubes 141 to 145, inclusive, are similar to those described as being the "A" channel matrix tubes, 133 to 137, inclusive, and operate in a similar manner.

The "C" channel distributor tube 123 and the "D" channel distributor tube 124 are each also connected similarly to a plurality of five associated matrix tubes. Inasmuch as the structure and operation of these tubes will be similar to that with respect to the tubes for the above described two channels it is not deemed necessary to go into detail in describing their connections and operations.

The output of the No. 1 impulse distributor tube 116 is impressed over a conductor 147 and through a condenser to the normally negatively biased control grids of the No. 1 impulse matrix tubes for all four channels, such as the tubes 133 and 141 for the "A" and "B" channels, respectively. The connection of these tubes is thus dissimilar to that described at the transmitting apparatus, and the potential applied to the control grids due to the operation of tube 116 consists of a positive impulse at the instant that tube 116 begins conduction and a negative impulse when it ceases to conduct. The positive potential impulse on the control grid is not sufficient in itself to cause the matrix tubes to be rendered conducting even though conditioning potential exists on the screen grids from the output of the appropriate channel distributor tube unless a secondary conditioning potential is applied from a third source, as will be hereinafter described. The negative impulse has no effect in the control of gas type tubes. The timing of the impulse distributor and channel distributor will be dissimilar to that described for the transmitting apparatus with the channel distributor operating between the times that the impulse distributor tubes operate. This is in order that the channel distributor may condition the screen grids of a particular channel set of matrix tubes in advance of the time that the impulse distributor begins energizing the control grids of the same matrix tubes.

The armature 127 of the line relay 126 is connected by means of a conductor 148 to circuits to the control grids of all of the matrix tubes for all four channels. However, even though a marking condition exists on the conductor 148 as will be described the potential applied to the control grids of all of the matrix tubes will not in itself be sufficient to allow one or more of the tubes to be rendered conducting.

If it now be assumed that a marking condition is being received on the signaling channel for a particular impulse the line relay 126 will be energized and will attract its armature 127 to its leftward position. Under this condition positive battery will be connected to the armature 127 and thence over the conductor 148 to the control grids of all of the matrix tubes. From a description of the transmitting apparatus it will be remembered that it was described that only one of the channel distributor tubes will be conducting at any one time and supplying conditioning potential to the screen grids of its associated matrix tubes. Therefore, let it be assumed that the "A" channel distributor tube 121 is conducting and supplying potential to the screen grids of its associated matrix tubes 133 to 137, inclusive. Likewise, under the described condition, the armature 127 and the conductor 148 will be supplying positive potential to the control grids of the same matrix tubes 133 to 137, inclusive, and to all other matrix tubes.

Under the above conditions at such time as any one of the impulse distributor tubes 116 to 120, inclusive, is rendered conducting, potential will be impressed over appropriate conductors such as the conductor 147 to impress potential on the control grids of the similarly numbered impulse position of all of the matrix tubes. Thus, if it be assumed that the tube 116 becomes conducting, a positive potential impulse will be impressed over the conductor 147 to all of the No. 1 impulse matrix tubes such as 133 and 141. With the three potentials being present on the screen and control grids of the tube 133 at this time, the tube 133 will be rendered conducting. It should be noted that this will be the only tube that will have conditioning potential on its screen grid from its associated channel distributor tube 121, conditioning potential on its control grid from the armature 127 of the line relay 126 and conductor 148, and operating potential on its control grid from its associated impulse distributor tube 116. As the tube 133 is of the gas filled variety it will be rendered conducting and remain in that condition irrespective of a change in grid potential.

If a spacing condition had existed on the signaling channel the line relay 126 would not have been energized and, therefore, the armature 127 would have remained in its illustrated unattracted position. Under this condition no positive battery would have been supplied through the armature 127 and over the common conductor 148 to serve as conditioning potential on the control grids of all of the matrix tubes. Therefore, even though conditioning potential were supplied to the screen grid of the tube 133, at such time as operating potential is applied to the control grid thereof by the impulse distributor tube 116, the tube 133 will not be rendered conducting as no conditioning potential exists on its control grid from the source associated with the line relay 126.

From the above description, it may be seen that the various matrix tubes at their interval for selection will be either rendered conducting in accordance with a marking condition or remain nonconducting in accordance with a spacing condition.

During the interval that the "A" channel distributor tube 121 is conducting the matrix tubes 133 to 137, inclusive will be operated in accordance with the five signal impulses being received over the signaling channel by the line relay 126. Thus, the signal conditions will be stored in these tubes because they are the type which once rendered conducting will continue to do so irrespective of grid potential.

It might be noted that the impulse distributor formed of the tubes 116 to 120, inclusive, operates in such a manner that the impulses delivered over the conductors such as 147 will occur at approximately the midpoint of the received line signal interval. Such timing is provided for theoretically the signal impulse should be best at this point, considering line distortion, etc. The timing relation between impulse distributor operation and line signal impulse occurrence is controlled and maintained by the corrector 129.

After all of the signals have been stored in the "A" channel matrix tubes 133 to 137, inclusive, the channel distributor will operate to cause the tube 122 to be rendered conducting and the tube 121 extinguished. Under this condition the receiving apparatus is now ready to receive and store the five impulse selections for the "B" channel in the matrix tubes 141 to 145, inclusive. Likewise, as the apparatus continues to operate a signal will be stored for each of the channels "C" and "D" and thereafter the cycle will be repeated for the "A" channel, as described.

It should be noted that the anodes of the "A" channel matrix tubes 133 to 137, inclusive, are connected over individual conductors, illustrated in cable form to a receiving unit indicated generally in block diagram form by the numeral 149. The unit 149 is illustrated as having the conductors being connected individually to five magnet windings 151, only two of which are shown. The circuit may be further completed over a conductor 152 and through the unattracted armature 153 of a relay 154 to positive battery. Therefore, under the above described conditions, at such time as any of the tubes 133 to 137, inclusive receive sufficient conditioning and operating potential the tube will be allowed to conduct with the anode battery being supplied through the associated winding 151 and unattracted armature 153. The windings 151 may be the individual windings of a five magnet printer which is well known in the art. However, the windings could be replaced by the appropriate elements in a multiplex to start-stop extensor or converter such as the type disclosed in the above mentioned Zenner patent or in copending application Serial No. 54,776, filed in the name of R. D. Slayton on October 15, 1948, now Patent No. 2,536,578. Thus, the five impulse selections as stored in the tubes 133 to 137, inclusive, will likewise be stored in the unit 149.

After the complete signal has been received in the matrix tubes 133 to 137, inclusive, and likewise in unit 149, which indicates that the entire signal for the "A" channel has been received, the channel distributor tube 122 will be rendered conducting with the tube 121 being extinguished, all as described previously. At the instant the tube 122 becomes conducting, the positive potential impressed from its output cathode circuit to the conductor 139 will also be impressed over a branching conductor 156 and through a condenser 157 to the control grid of a gas filled tube 158. The anode of the gas filled tube 158 is connected by means of a conductor 159 through the winding of a magnet 161 to the conductor 152, which extends to the positive battery through the unattracted armature 153. Thus, because of the single positive impulse through the condenser 157 the tube 158 will be rendered conducting and remain in that condition because it is of the gas filled variety.

Upon the tube 158 becoming conducting the magnet 161 will be energized. It is contemplated that the magnet 161 will be, if the device is a five magnet printer, the magnet which releases such printer to cause the actual printing of the character which is stored in the individual windings 151. However, if the unit 149 is an extensor or converter the magnet 161 will be replaced by suitable components or the positive impulse on the conductor 156 and through the condenser 157 will be utilized to initiate retransmission of the start-stop signal.

The relay 154 also receives positive battery through the unattracted armature 153 and over the conductor 152, which circuit is completed at such time as the tube 158 is conducting over the conductor 159 and through the tube. However, a condenser 162 is placed in shunt relationship with respect to the winding of the relay 154 and therefore, at such time as the tube 158 is rendered conducting a predetermined interval will exist during which the condenser 162 is being charged through the series resistor until the potential across the relay 154 is sufficient to allow the relay to be energized. The above-mentioned predetermined interval will be sufficient in duration to allow the magnet 161 to be energized to serve its purpose in the apparatus.

Upon the relay 154 becoming energized it will attract its armature 153 thereto resulting in positive battery no longer being supplied through the armature 153 to the conductor 152. As it was described previously that the anode potential for the matrix tubes 133 to 137, inclusive, for the tube 158 and the energizing potential for the windings of the magnet 161 and the relay 154 all were provided from the positive battery through the unattracted armature 153 it may be seen that upon the relay 154 becoming energized all of the above circuits will be broken. Therefore, any of the matrix tubes 133 to 137, inclusive, which may have been rendered conducting to store a marking impulse will be extinguished at this time, in readiness for the storage of the next received signal on the "A" channel. Likewise, the tube 158 will be extinguished with the magnet 161 and the relay 154 de-energized. Under this condition the apparatus will all be in readiness for the receipt of the next "A" channel signal, the utilization thereof and the resetting of the apparatus to its normal unoperated condition. The condenser 162 across the coil of relay 154 sustains the operating current in said relay long enough to insure complete extinguishment of tube 158.

While a detailed description has been given with respect to the control circuit for the "A" channel similar control circuits have been illustrated for the "B," "C," and "D" channels. However, as these operate similarly to that described above it does not appear necessary to describe in detail their interconnections and operations.

From the above description it has been seen that a receiver has been disclosed which operates to receive a five unit code on four channels of transmission. However, it is obvious that either the unit code or channels may be increased or decreased by suitable additions or subtractions in the impulse distributor, channel distributor, matrix tubes, and alteration of frequency output from the impulse frequency divider 107 and/or the channel frequency divider 108, with similar changes being made in the cooperating multiplex transmitter, as described previously.

While a specific embodiment of the invention has been illustrated and described it is obvious that the invention is not limited to such disclosure but that additions and modifications may be made thereto within the scope and spirit of the invention.

What is claimed is:

1. In a telegraph receiver, signal receiving means for receiving signals from a signaling channel, a plurality of groups of matrix tubes conditioned by said signal receiving means, a distributor for conditioning each of said groups of matrix tubes successively, a distributor for operating conditioned ones of said matrix tubes successively in each group, means for driving said distributors at their proper relative speeds, whereby said one distributor conditions each of said groups of matrix tubes and said other distributor operates conditioned ones of said matrix tubes in each group, and separate means for utilizing the received signals under the control of each of said groups of matrix tubes.

2. In a telegraph receiver for separating received signals into impulse positions and channel positions, signal receiving means for receiving signals from a signaling channel, a plurality of matrix tubes conditioned by said signal receiving means, an electronic distributor of the ring type for conditioning said matrix tubes in channel positions, an electronic distributor of the ring type for causing operation of said matrix tubes conditioned simultaneously by both said signal receiving means and said channel distributor in impulse positions, means for driving said distributors at their proper relative speeds, whereby said one distributor conditions said matrix tubes in channel positions and said other distributor operates conditioned ones of said matrix tubes in impulse positions, and separate signal utilization means controlled by said matrix tubes in each channel position in accordance with the impulse positions.

3. In a telegraph receiving terminal, means for receiving incoming signals from a signaling medium, each of said signals comprising a group of impulses, each succeeding signal group of impulses being indicative of one channel of a predetermined number of different channels, a distributor operating at impulse speed, a distributor operating at channel speed, separate signal utilization means, and means to distribute the incoming signals from said receiving means to said separate signal utilization means under the joint control of said impulse distributor and said channel distributor.

4. In telegraph receiving apparatus, a plurality of recorders, an electronic ring channel distributor formed of a plurality of tubes, each of said tubes controlling reception in one of said recorders, means to cause the operation of said channel distributor by causing said tubes to be rendered conducting successively, and means controlled by the rendering conducting of each of said tubes to cause a received signal to be recorded in the one of said recorders controlled by the preceding one of said tubes.

5. In a telegraph receiving terminal, separate signal utilization means, an electronic ring channel distributor formed of a plurality of tubes, each of said tubes controlling a separate one of said signal utilization means, means to cause the operation of said channel distributor by causing said tubes to be rendered conducting successively, and means controlled by the rendering conducting of each of said tubes to perform a control function in the one of said signal utilization means controlled by the preceding one of said tubes.

6. In a telegraph receiver, signal receiving means for receiving signals from a signaling channel, a plurality of groups of matrix tubes conditioned by said signal receiving means, a distributor for conditioning each of said groups of matrix tubes successively, a distributor for operating conditioned ones of said matrix tubes successively in each group, an oscillator, a frequency divider controlled by said oscillator for operating said distributor for conditioning each of said groups of matrix tubes, a frequency divider controlled by said oscillator for operating said distributor for operating conditioned ones of said matrix tubes, and separate means for utilizing the received signals under the control of said groups of matrix tubes.

References Cited in the file of this patent

UNITED STATES PATENTS

| Number | Name | Date |
|---|---|---|
| 1,864,074 | Krum | June 21, 1932 |
| 2,345,628 | Pierson | Apr. 4, 1944 |
| 2,365,450 | Bliss | Dec. 19, 1944 |
| 2,412,642 | Wilkerson | Dec. 17, 1946 |
| 2,465,355 | Cook | Mar. 29, 1949 |